United States Patent [19]

Alpert

[11] 3,792,929

[45] Feb. 19, 1974

[54] SPECTROPHOTOMETER UTILIZING FLUID LENS MEANS

[75] Inventor: Nelson L. Alpert, Stamford, Conn.

[73] Assignee: Electro-Nucleonics Inc., Fairfield, N.J.

[22] Filed: May 24, 1972

[21] Appl. No.: 256,359

[52] U.S. Cl.................. 356/197, 356/96, 356/99
[51] Int. Cl........................ G01n 21/24, G01j 3/42
[58] Field of Search... 356/96, 97, 98, 99, 100, 101, 356/197; 350/19

[56] References Cited
UNITED STATES PATENTS

| | | | |
|---|---|---|---|
| 3,563,656 | 2/1971 | Helms | 356/96 |
| 3,554,648 | 1/1971 | Boostrom et al. | 356/96 |
| 3,205,767 | 9/1965 | Weber et al. | 350/19 |
| 3,582,218 | 6/1971 | Anderson | 356/197 |

Primary Examiner—John K. Corbin
Assistant Examiner—V. P. McGraw
Attorney, Agent, or Firm—Cooper, Dunham, Clark, Griffin and Moran

[57] ABSTRACT

A means for passing radiant energy in a spectrophotometer through a sample holder without striking the walls thereof, including a field lens positioned adjacent the exit slit of the system for forming an image of the radiant energy dispersing element in the system onto a region on the far side of the sample holder. The field lens tunnels radiant energy through the sample holder without striking the walls thereof.

11 Claims, 3 Drawing Figures

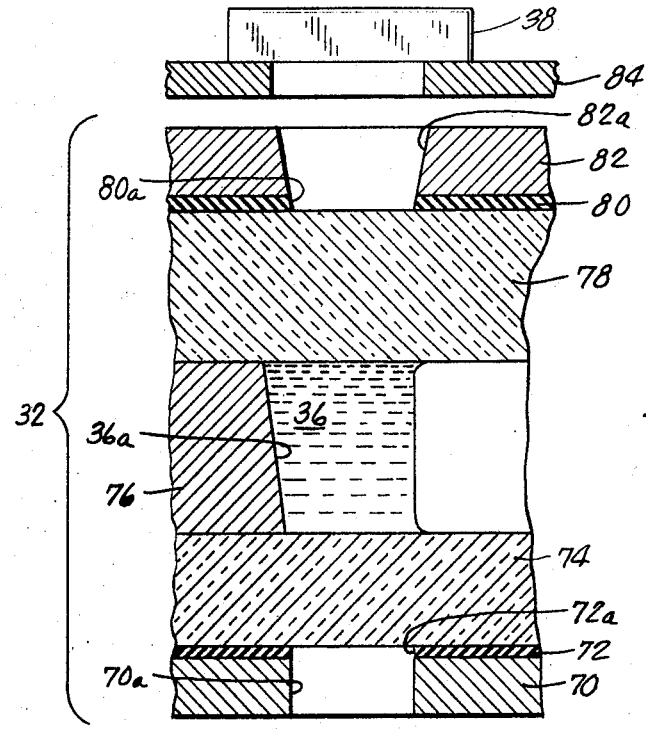
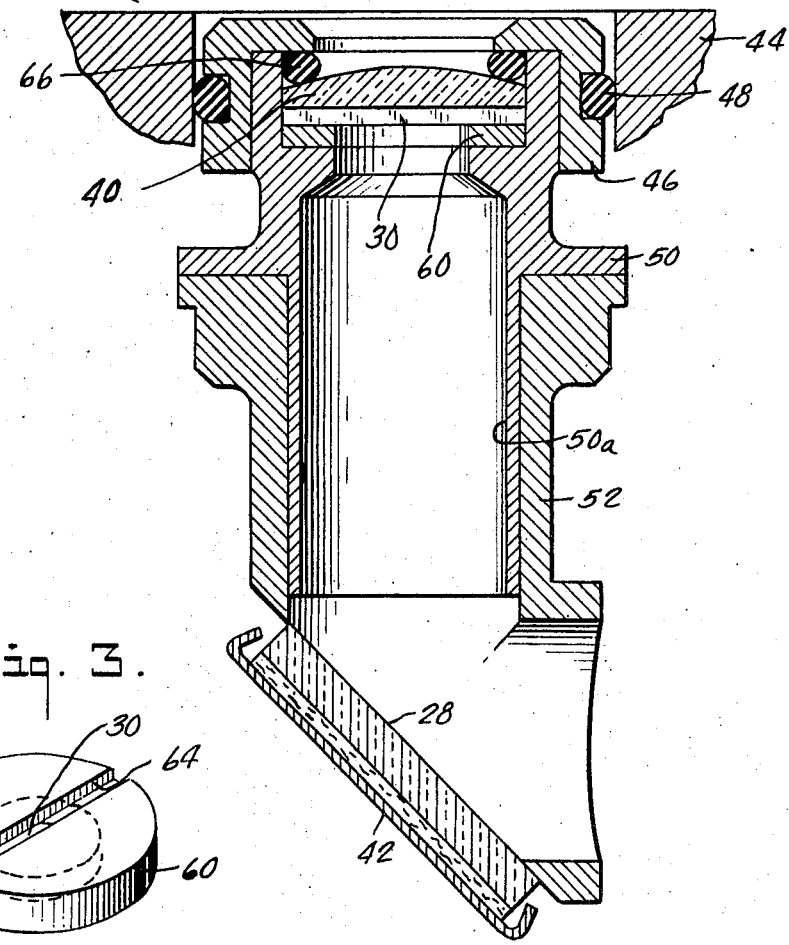

SPECTROPHOTOMETER UTILIZING FLUID LENS MEANS

BACKGROUND AND BRIEF DESCRIPTION OF THE INVENTION

This invention relates to radiant energy projecting systems, and more particularly to a system for directing radiant energy from a monochromator in a spectrophotometer through a small moving sample holder such that rays of radiant energy do not strike the walls of the sample holder during a predetermined portion of the movement of the sample holder.

Spectrophotometers currently in use, particularly those involving small-size sample holders, typically form an image of the exit slit in the sample holder. Such arrangements are not practical unless it is feasible to space by relatively large distances the various elements of the system. In addition, rays of radiant energy converging in the sample holder and diverging therefrom will tend to strike the walls of the sample holder. The present invention is directed toward those systems involving small-size smaple holders in which space limitations require a close spacing of sample holder and exit slit, rendering it unfeasible to image the exit slit in the sample holder or to place the sample holder adjacent the exit slit and eliminate entirely an imaging lens. In such systems it would be possible to use apertures to reduce the radiant energy to ensure that no rays strike the walls of a sample holder. This is very wasteful of energy, however, and from this standpoint such a solution to the problem is undesirable.

In the present invention a field lens is employed to "tunnel" radiant energy through a sample holder without striking the walls thereof. The field lens is adapted to be positioned adjacent to the exit slit of a monochromator, forming a part of a spectrophotometer, and projects a reduced image of the radiant energy dispersing element (e.g., diffraction grating) of the monochromator onto a region on the far side of the sample holder at which a radiant energy sensing device may be advantageously positioned. In projecting the image of the dispersing element onto a region on the far side of the sample holder, no rays of radiant energy strike the walls of the sample holder. In a system in which sample holders move at high speed during testing, the walls of each holder pass through the beam of radiant energy during such movement. However, the field lens of the present invention ensures that during a predetermined portion of the movement of each sample holder, e.g., when the sample holder is positioned opposite a photosensitive element, radiant energy from the field lens passes through the sample holder without striking the walls thereof. It is during such time that an appropriate test signal is developed suitable for data processing. By use of a field lens it is also possible to change the widths of the entrance and exit slits of the system, for example, to change the bandwidth of the radiant energy, without materially affecting the size of the beam that is projected through the sample holder. This operation is not possible in those systems in which an exit slit is imaged in the sample holder.

The following patents are representative of the prior art:

| U.S. PAT. NO. | PATENTEE | ISSUE DATE |
|---|---|---|
| 3,555,284 | Norman G. Anderson | 12 Jan. 1971 |
| 3,513,704 | Donald W. Hatcher | 26 May 1970 |
| 3,004,465 | J.U. White | 17 Oct. 1961 |
| 2,679,184 | J. G. Atwood | 25 May 1954 |
| 2,634,194 | E. W. Kellogg, et al. | 14 April 1953 |
| 2,631,489 | M. J. E. Golay | 17 Mar. 1953 |
| 2,192,580 | L. T. Sachteleben | 5 Mar. 1940 |

The invention will be more completely understood by reference to the following detailed description, to be read in conjunction with the appended drawing.

BRIEF DESCRIPTION OF THE DRAWING

FIG. 2 is a sectional view through a part of a representative spectrophotometer further illustrating the invention.

FIG. 3 is a perspective view of a part of the apparatus shown in FIG. 2.

DETAILED DESCRIPTION

Figure 1:
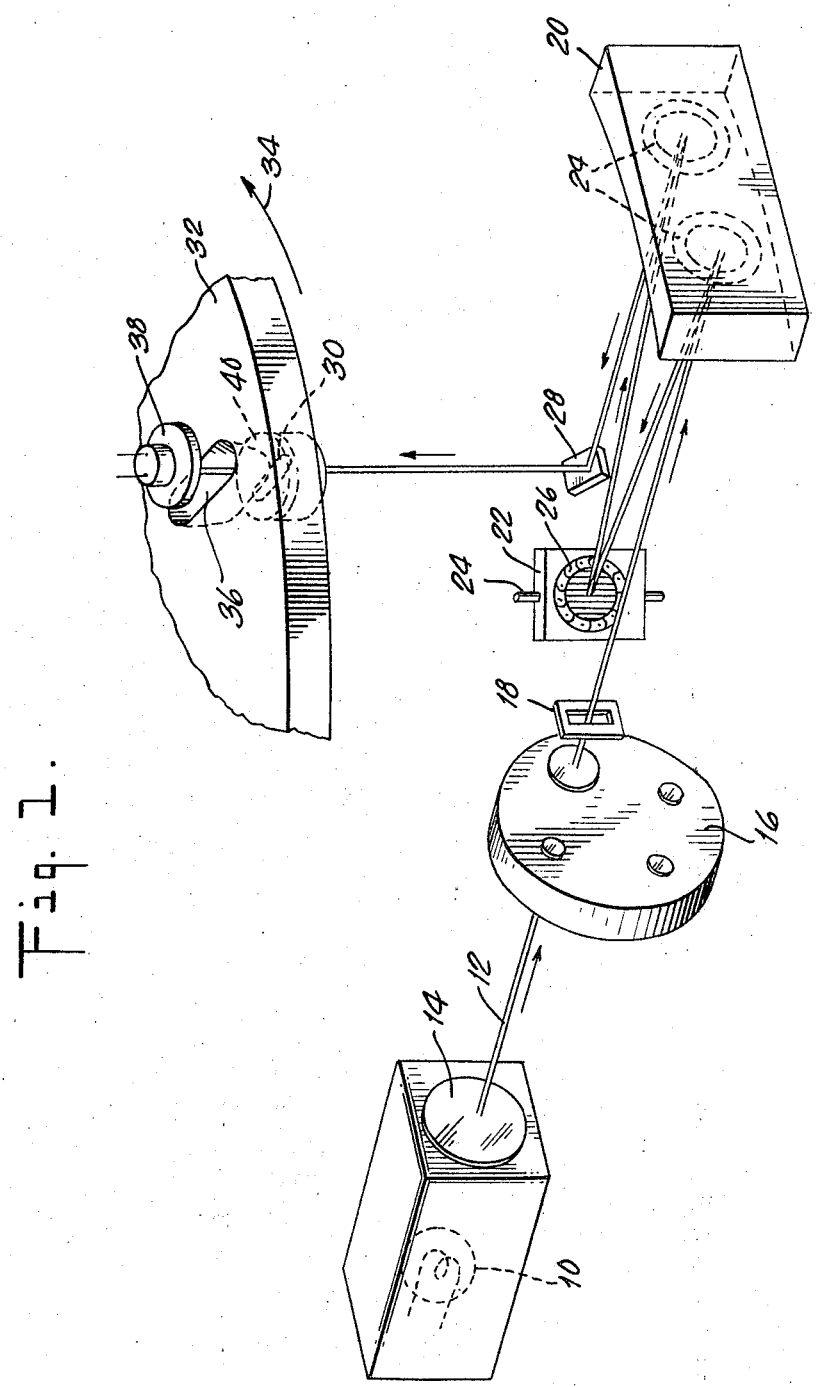
FIG. 1 is a perspective view of a representative spectrophotometer embodying the invention.

Referring to FIG. 1, a representative spectrophotometer is illustrated in diagramatic fashion. A source 10 of radiant energy advantageously in the ultraviolet through visible range generates a beam 12 of radiant energy which is directed by a lens 14 to a filter 16. The radiant energy is filtered by the filter and passes through an entrance slit 18 to a mirror 20. The mirror 20 reflects radiant energy from the entrance slit 18 onto a dispersing element 22, e.g., a diffraction grating. The radiant energy dispensing element 22 is pivotable about an axis 24, and its angular position is selected in accordance with the wavelength of the desired radiant energy output from the system. Radiant energy reflected from the element 24 proceeds to the mirror 20 and is reflected therefrom to another mirror 28. In this connection both the mirror 20 and dispersing element 22 may have associated therewith apertures 24 and 26 respectively to reduce stray energy and to match the imaged shape of the dispersing element to sample holder, to be described in more detail below. The path of radiant energy which has been limited to one plane (horizontal) to this point is then reflected by the mirror 28 in another plane (vertical). The radiant energy reflected from the mirror 28 passes through an exit slit 30, whose width determines the spectral bandwidth of the radiant energy passing therefrom.

Everything just described is essentially conventional, and comprises an Ebert type monochromator. Also included as part of the spectrophotometer is a disc 32 which rotates in close proximity to the exit slit 30 in the direction of arrow 34 and which contains a small-size sample holder 36 therein, e.g., a cuvette that holds a liquid sample to be analyzed. Positioned above the disc 32 in close proximity thereto is a radiant energy sensing element 38, such as a photosensitive diode. While these items of the assembly are conventional, their close positioning is unconventional.

The invention involves the use of a field lens 40 which receives radiant energy from the exit slit 30 and which directs it through the sample holder 36 so that it impinges upon the radiant energy sensing element 38. The field lens 40 is positioned closely adjacent (advantageously directly against) the means that defines the exit slit 30, and forms an image of the dispersing element 22 on the far side of the sample holder 36, i.e., substantially upon the radiant energy sensing element 38. During the time that the disc 32 is in the position shown above the exit slit 30 and below the sensing element 38, the radiant energy that is directed by the filed lens to the sensing element does not strike the walls of the sample holder.

FIG. 2 shows the details of a part of a representative spectrophotometer, illustrating a field lens and exit slit in accordance with the invention. In FIG. 2, the mirror 28 is held in place by a mirror support 42. The field lens 40 is positioned in a lower shroud housing 44. A cap 46 is sealed to the lower shroud housing 44 by an O-ring seal 48. The cap 46 surrounds a lens and exit slit aperture holder 50. The holder 50 includes a downwardly depending cylindrical portion 50a that is contained within a housing 52. The holder 50 mounts the field lens 40 as well as the means defining the exit slit 30. This latter means is shown in more detail in the perspective view of FIG. 3, and may comprise disc 60 which is partially drilled through from one side, as at 62, and which is partially cut through from the other side, as at 64, to produce therein the exit slit 30. The disc 60 is positioned within the holder 50 as shown in FIG. 2. Positioned directly on top of the disc 60 is the field lens 40, which may be held in place by another O-ring 66. It will be noted, thus, that the field lens 40 is positioned directly against the exit slit defining means 60 of the monochromator.

Positioned above the lower shroud housing 44 and immediately above the field lens 40 is lower rotor flange 70, that includes an opening 70a therethrough. Positioned over the lower rotor flange is a gasket 72, which includes an opening 72a therein. A lower blank 74 is positioned over the gasket 72, and is typically of radiant energy transparent material such as quartz. A sample holder ring 76 is positioned over the lower blank 74, and includes the sample holder 36 (e.g., the liquid filled cuvette) therein. A top blank 78 is positioned over the sample holder ring 76, and may also be of radiant energy transparent material such as quartz. A gasket 80 that includes an opening 80a therein is positioned over the top blank 78. The opening 80a in the gasket 80 serves as an exit aperture for the system. A top rotor flange 82 is positioned over the gasket 80, and includes an opening 82a therein. The assembly of parts between the lower and top rotor flanges 70 and 82 constitutes the disc 32 shown diagramatically in FIG. 1.

Radiant energy sensing element 38 is positioned upon a stationary mount 84 opposite the field lens 40. During the time that the rotating disc 32 is in the position shown in FIG. 2, radiant energy is directed by the field lens 40 therethrough to impinge upon the sensing element 38. By use of the field lens, rays of radiant energy do not impinge upon the sides 36a of the sample holder 36. Because of the small distance between the sample holder 36 and the exit slit 30, as shown in FIG. 2, it is not feasible to form an image of the exit slit 30 inside the sample holder 36 without the rays of radiant energy undesirably striking the sides 36a of the sample holder. Through use of a field lens this problem is obviated. The field lens 40 forms a reduced image of the dispersing element 22 of FIG. 1 in a region on the far side (above) the sample holder 36, at the sensing element 38.

The size of the dispersing element 22 is chosen so that the image thereof that is formed on the sensing element 38 is not so large as to result in rays of radiant energy striking the walls of the sample holders. If necessary, an aperture such as designated 26 in FIG. 1 may be employed to match the shape of the dispering element to the cross-sectional shape of the sample holder. Additional apertures (not shown) adjacent the entrance and exit slits 18 and 30 may also be employed to match the shape of the ends of the slits to the cross-sectional shape of the sample holder.

While the radiant energy sensing element 38 is shown in FIG. 2 as being positioned directly adjacent the top rotor flange 82, an alternative arrangement would be to substitute a lens (not shown) for the sensing element. Such a lens would be used either to transfer the image formed by the field lens 40 from a region adjacent the top rotor flange 82 to a further, more remote position at which the sensing element 38 would be positioned or to form an image of exit slit 30 at such a repositioned sensing element. Further, while the field lens 40 has been shown on the sample holder side of the exit slit 30, it is possible to position the field lens on the other side of the exit slit, i.e., on the other side of the disc 60.

It should be noted that changes in the widths of the entrance and exit slits 18 and 30 have virtually no effect on the image formed at the sensing element 38. Thus the widths of these slits may be changed to vary the bandwidth of radiant energy applied to the sample holder without requiring a compensating change in the field lens. As a result, differently slitted discs 60 may be conveniently substituted in the assembly of FIG. 2 without change of field lens.

The dimensions of the slits, as all dimensions in the optical system, are chosen so that the rays of radiant energy exiting from the field lens 40 do not impinge upon the sides 36a of the sample holder 36 when the sample holder is in the position shown in FIG. 2. Aperture stops may be employed to achieve this, where necessary, and to match shapes to the cross-sectional shape of the sample holder.

It will be appreciated that the representative but presently preferred embodiment discussed above is subject to change. Accordingly, the invention should be taken to be defined by the following claims.

What is claimed is:

1. An improved spectrophotometer for passing radiant energy through a sample holder comprising means defining an exit slit of a monochromator and positioned in close proximity to a sample holder, and field lens means positioned adjacent to said exit slit defining means for directing said radiant energy through said sample holder without substantially striking the walls thereof.

2. A spectrophotometer according to claim 1, in which said field lens means is positioned against said exit slit defining means.

3. A spectrophotometer according to claim 1, in which said field lens means is positioned between the exit slit defining means and said sample holder.

4. A spectrophotometer according to claim 1, in which said spectrophotometer includes a radiant energy dispersing element, and said field lens means projects an image of said radiant energy dispersing element onto a region on the far side of said sample holder.

5. A spectrophotometer according to claim 4, including a radiant energy sensing element for sensing the radiant energy that is projected through said sample holder.

6. A spectrophotometer according to claim 4, including means defining an aperture positioned adjacent said radiant energy dispersing element to match the shape thereof to the shape of said sample holder.

7. A spectrophotometer according to claim 4, in which said sample holder is adapted to move and said field lens means operates to direct said radiant energy so that substantially no part thereof strikes the walls of the sample holder during a predetermined portion of the movement of the sample holder.

8. A spectrophotometer according to claim 1, in which said spectrophotometer includes a radiant energy dispersing element and a radiant energy sensing element, and said field lens means projects an image of said radiant energy dispersing element substantially onto said radiant energy sensing element.

9. A spectrophotometer according to claim 1, including means defining an aperture positioned adjacent to said exit slit defining means to match the shape thereof to the shape of said sample holder.

10. An improved radiant energy output system for a spectrophotometer, said spectrophotometer including a monochromator and a sample holder, the improvement comprising means for mounting an exit slit of the monochromator in close proximity to the sample holder, and field lens mounting means for mounting a field lens means adjacent to said exit slit to direct radiant energy from said monochromator through the sample holder substantially without striking the walls thereof.

11. An improved radiant energy output system for a spectrophotometer including a monochromator and a sample holder, the improvement comprising means defining an exit slit of the monochromator adapted to be mounted in close proximity to the sample holder, and field lens means mounted adjacent to said exit slit means for forming an image of the light dispersing element in the monochromator on the far side of the sample holder.

* * * * *